No. 665,948. Patented Jan. 15, 1901.
J. WHITTINGTON.
ATTACHING OR DETACHING DEVICE.
(Application filed Mar. 3, 1900.)
(No Model.) 2 Sheets—Sheet 1.
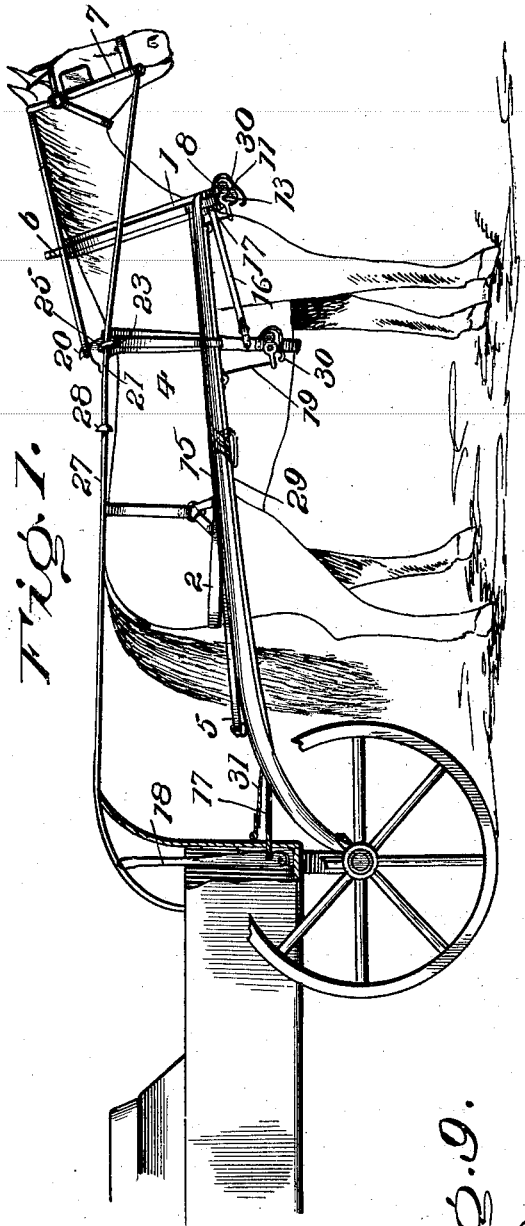
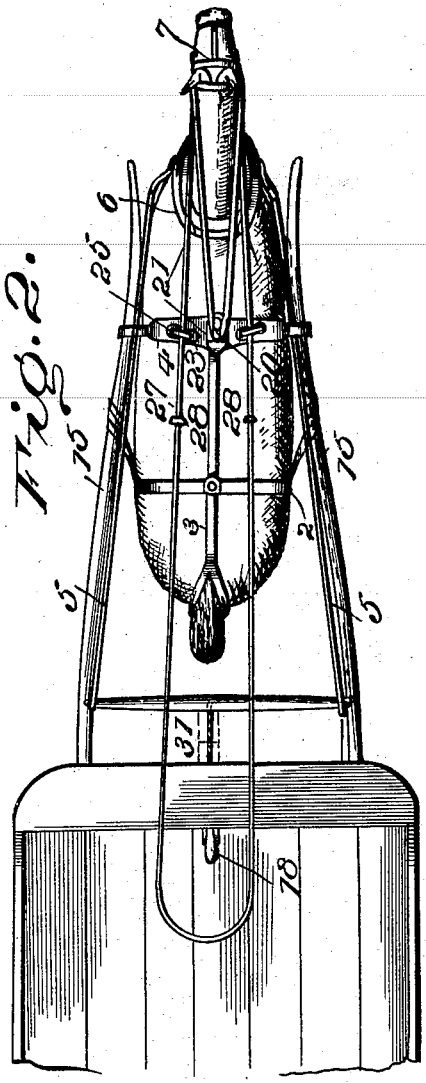
Witnesses
Jno. Imirie
Gladys L. Thompson
Inventor
James Whittington
by R. S. & A. B. Lacey his Attorneys
THE NORRIS PETERS CO., PHOTO-LITHO., WASHINGTON, D. C.

No. 665,948. Patented Jan. 15, 1901.
J. WHITTINGTON.
ATTACHING OR DETACHING DEVICE.
(Application filed Mar. 3, 1900.)
(No Model.) 2 Sheets—Sheet 2.

Witnesses
Gladys L. Thompson

Inventor
James Whittington
by R.S.&A.B. Lacey his Attorneys

THE NORRIS PETERS CO., PHOTO-LITHO., WASHINGTON, D. C.

UNITED STATES PATENT OFFICE.

JAMES WHITTINGTON, OF WILLIFORD, ARKANSAS.

ATTACHING OR DETACHING DEVICE.

SPECIFICATION forming part of Letters Patent No. 665,948, dated January 15, 1901.

Application filed March 3, 1900. Serial No. 7,240. (No model.)

*To all whom it may concern:*

Be it known that I, JAMES WHITTINGTON, a citizen of the United States, residing at Williford, in the county of Sharp and State of Arkansas, have invented certain new and useful Improvements in Horse-Detachers; and I do hereby declare the following to be a full, clear, and exact description of the invention, such as will enable others skilled in the art to which it appertains to make and use the same.

This invention has for its object to prevent accident and injury to the vehicle and occupants thereof in the event of the horse becoming frightened, unruly, and tending to run away by the provision of a releasing mechanism of novel, simple, and effective construction under the control of the driver to liberate and admit a disengagement of the animal from the shafts. The harness, with the exception of the bridle and collar, is hitched to the shafts in such a manner as to clear the animal when the latter is released and plunges forward, thereby reducing the chances of injury to the animal and objects in the path of the animal, which would be liable to result from the catching of the harness if arranged to be carried with the animal.

For a full description of the invention and the merits thereof, and also to acquire a knowledge of the details of construction of the means for effecting the result, reference is to be had to the following description and the drawings hereto attached.

While the essential and characteristic features of the invention are necessarily susceptible of modification, still the preferred embodiment of the invention is illustrated in the accompanying drawings, in which—

Figure 3:
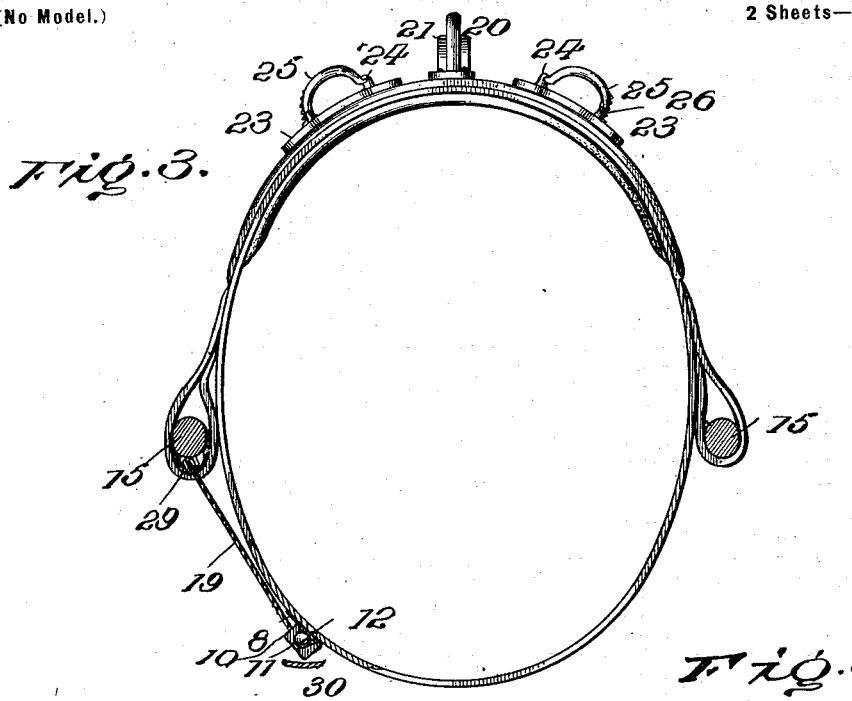
Figure 6:
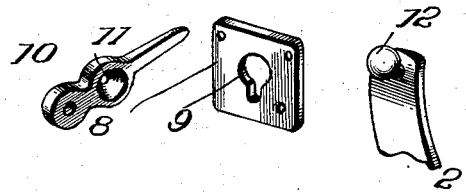
Figure 4:
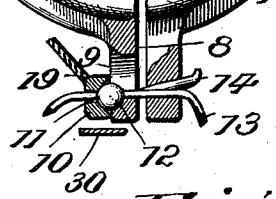
Figure 7:
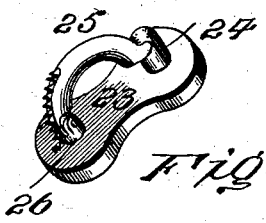
Figure 5:
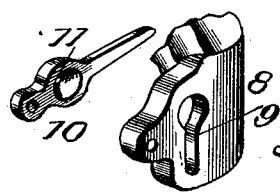
Figure 8:
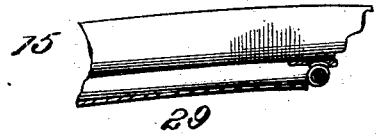

Figure 1 is a side elevation of a harness and releasing mechanism embodying the invention, the same being shown in operative relation. Fig. 2 is a top plan view. Fig. 3 is a front view of the saddle and girth, the latter being broken away and the shafts being shown in section. Fig. 4 is a detail view of the lower ends of the hames, parts being broken away to show more clearly the relation of the fastening means. Fig. 5 is a detail view in perspective of the parts comprising the hames-fastening, said parts being separated and disposed in a group. Fig. 6 is a detail view in perspective of the component parts of the fastening for the girth. Fig. 7 is a detail view in perspective of a terret or rein-guide. Fig. 8 is a detail view of a portion of a shaft, showing the tube or housing for the releasing-cord. Fig. 9 is a detail view of the check-hook.

Corresponding and like parts are referred to in the following description and indicated in all the views of the drawings by the same reference characters.

The harness illustrated may be of any make or style and is constructed to be hitched in such a manner as to permit its detachment from the animal when the latter is liberated, and comprises the usual parts. The collar 1 is applied to the animal in the ordinary manner and remains attached or in position when said animal is freed from the remaining portion of the harness and the vehicle. The breeching 2, back-strap 3, saddle 4, traces or tugs 5, hames 6, and bridle 7 are well-known parts of a harness and may have any arrangement and desired formation.

The girth, as well as the lower ends of the hames, is detachably connected by fastenings having substantially the same formation and comprising a member 8, formed with a keyhole-slot 9, a pivoted member 10, applied to the member 8 and having a centrally-disposed opening 11, enlarged at its inner end, approximately of hemispheroidal shape, and a ball-coupling 12, the latter adapted to pass through the enlarged end of the keyhole-slot 9 and engage with the contracted or smaller end of said slot and held in place normally by means of the pivoted member 10 by entering the opening or seat 11 thereof. The member 8, with the lever 10, is applied to one portion of the harness to be connected, either to one of the hames or the separable portion of the girth, and the ball-coupling 12 is applied to the other part to coöperate with the member 8 and secure the parts when properly fitted or drawn together. When the ball or coupling member 12 is thrust through the larger end of the keyhole-slot 9, it is received into the seat or opening 11 of the part 10, and upon turning the lever 10 downward at its free end the coupling 12 is caused to enter the contracted or smaller end of the keyhole-slot 9, thereby securing the parts to which the members of the fastening are applied.

The ball-coupling 12 may have adjustable connection with the part to which it is permanently attached, and this is of especial advantage in connection with the hames, so as to allow for stretching and like variations of distance between the opposing ends of the parts to be connected. A thong, as 13, or like flexible connection has the ball-coupling or like part 12 secured to an end portion thereof, the opposite end having adjustable connection with the lower end of the hame opposite that carrying the member 8 by passing through an opening therein and confined in said opening at the required adjusted position by means of a key or wedge 14. The end portion of the thong or equivalent part 13, carrying the coupling member 12, is made tapering, so as to be readily passed through the keyhole-slot 9 and the opening 11 of the lever 10, the projecting end being grasped and pulled upon to cause the coupling 12 to pass through the keyhole-slot 9 and enter the seat 11 of the lever 10 when the latter is moved to bring the coupling 12 in engagement with opposite portions of the member 8 adjacent to the contracted end portion of the keyhole-slot. The traces or tugs 5 connect the hames directly with the terminals of the singletree, and the attaching-straps of the breeching are wrapped about and applied to the shafts 15 in any convenient way. Short straps 16 have their front ends secured to the lower end portions of the hames and their rear ends downwardly inclined and attached to the girth, so as to support the hames when the animal is unhitched or liberated from the vehicle-shafts. A releasing-cord 17 extends from a lever 18, applied to the vehicle within convenient reach of the driver, and connects with the free end of the lever 10, applied to the fastening of the hames, and a branch 19 connects the releasing-cord 17 with the lever 10 of the fastening applied to the girth. In the event of the animal being fractious, unruly, frightened, and dashing forward, so as to endanger the safety of the occupants of the vehicle, a pull upon the lever 18 will draw the cord 17 and branch 19 taut and lift the free ends of the levers 10 of the fastenings and bring the couplings 12 in register with the larger ends of the keyhole-slots 9, when the tension upon said couplings will draw them out of engagement with the members 8 and set the animal free.

The check-hook 20 is spring-actuated and pivoted to the base 21, which is secured to the saddle in any desired manner, the spring operating upon the check-hook being sufficiently strong to maintain the overdraw or check-line in engagement with the check-hook under normal conditions, but yielding to admit the check-line to become released when the animal is liberated by operating the lever 18 in the manner set forth.

The terrets or rein-guides applied to the saddle comprise a base 23, having a hooked stud 24 at one end and a pivoted member 25, attached to a stud 26, having swivel connection with the opposite end of said base, whereby the inner or upper free end of the pivoted member 25 is adapted to swing laterally and upwardly, the lateral movement providing for a disengagement of the free end of the part 25 from the hooked end of the stud 24 and the outward movement releasing the reins 27. These terrets are applied to the saddle in such a manner as to incline transversely in opposite directions, as shown most clearly in Fig 2, whereby the free end of the pivoted members 25 are adapted to be engaged by buttons or stops 28, applied to reins 27, when the animal moves forward after being released.

The releasing-cord 17 and branch 19 pass over suitable direction-pulleys applied to the shafts and cross-bar, and the portion of the cord 17 adjacent to the shaft is housed by a tube or protector 19, applied to said shaft. In order to guard against the casual operation of the releasing-cord 17 or either one of the levers 10, suitable fenders or guards will be provided, the guard 30 being applied to the member 8 and underlapping or coming beneath the lever 10, so as to prevent upward movement thereof by striking an object, and the guard 31 protecting the portion of the cord 17 extending from the dash of the vehicle to the cross-bar of the shafts.

Having thus described the invention, what is claimed as new is—

1. In horse-detaching mechanism, a fastening for the separable parts of a harness, the same comprising a member having an approximately keyhole-shaped slot, a releasing device pivoted to said member and having a seat, and a coupling member adapted to cooperate with the slotted member and pivoted releasing device, substantially as set forth.

2. In horse-detaching mechanism, a fastening for the separable parts of harness, the same consisting of a member having an approximately keyhole-shaped slot, a lever pivoted to the said member and having a seat intermediate of its ends, and a coupling member adapted to cooperate with the slotted member and pivoted lever in the manner set forth.

3. In horse-detaching mechanism, a fastening for the separable parts, the same comprising a member having a slot of approximately keyhole form, a lever pivoted to said member and having an opening, a thong adapted to have an end portion thrust through the openings of the aforesaid member and pivoted lever, and a coupling member applied to said thong and adapted to cooperate with the slotted member and lever, substantially as specified.

4. In combination with hames, a fastening comprising a member having a keyhole-shaped slot, a lever pivoted to said member and having an opening enlarged at its inner end to form a seat, a thong, means for detachably connecting the thong to the opposite hame from that bearing the slotted member, and a coupling device applied to the said thong for coöperation with the slotted member and pivoted lever, substantially as set forth.

5. In horse-detaching mechanism, a fastening to be applied to the separable parts of harness, the same comprising a member having an approximately keyhole-shaped slot, a lever pivoted to said member and having an opening enlarged at its inner end to form a seat, a guard applied to the slotted member for preventing casual movement of the lever, and a coupling member adapted to be thrust through the keyhole-shaped slot and into the seat of the pivoted lever, as and for the purpose set forth.

In testimony whereof I affix my signature in presence of two witnesses.

JAMES WHITTINGTON. [L. S.]

Witnesses:
STANTON BLACKLEDGE,
W. A. YATES.